United States Patent Office 3,369,002
Patented Feb. 13, 1968

3,369,002
PERFLUOROALKYL TRIAZINE ELASTOMERS AND
METHOD FOR MANUFACTURING SAME
Warren R. Griffin, Dayton, Ohio, assignor to the United
States of America as represented by the Secretary of
the Air Force
No Drawing. Filed Jan. 24, 1964, Ser. No. 340,107
8 Claims. (Cl. 260—78.4)

ABSTRACT OF THE DISCLOSURE

Making a perfluoroalkyl triazine elastomer by mixing a perfluoroalkyl monoamidine and a perfluoroalkyldinitrile at 23–45° C. to make a bis-(perfluoroalkyl-imidoyl-amidine new intermediate selected from the group of N,N'-bis-(perfluorobutylimidoyl)perfluoroglutaramidine
N,N'-bis-(perfluorocaprylimidoyl)perfluoroglutaramidine
N,N'-bis-(perfluorobutyrimidoyl)perfluoroadipamidine
N,N'-bis-(perfluorocaprylimidoyl)perfluoroadipamidine and copolymerize the intermediate with a reactant selected from the group of perfluoroalkyldinitrile and an ammonia addition product of perfluoroalkyldinitrile at 120–150° C. in making the end product.

The invention described herein may be manufactured and used by or for the Government of the United States of America for governmental purposes without the payment of any royalties thereon or therefor.

The present invention relates to perfluoroalkyl triazine polymers and particularly to the high molecular weight linear perfluoroalkyl triazine polymers having desirable elastomeric properties and to the method for obtaining the same.

The ever-increasing interest of the art in the unique and promising characteristics and properties of fluorine-containing compounds has focused considerable attention on perfluoroalkyl triazines and various synthetic methods for the preparation thereof. Early synthesis involved the direct trimerization of perfluoroalkyl nitriles to symmetrical triazines under pressures of from 700 to 900 pounds per square inch and at temperatures of from 300 degrees to 350 degrees centigrade. The excellent thermal and oxidative stability of the single ring perfluoroalkyl symmetrical triazines suggested research on high polymers of this nature. The direct trimerization of perfluoroalkyl nitriles to the triazine structure, however, even with the aid of catalysts, has not proven to be a reasonably successful route for polymers. More recently, a synthetic method for the preparation of perfluoroalkyl triazines has involved the cyclization of perfluoroalkyl amidines at relatively low temperatures of from 100 to 150 degrees centigrade and under normal atmospheric pressure. In view of the relatively mild conditions required for this cyclization of the perfluoroalkyl amidines (ammonia adducts of nitriles) and the near quantitative conversion to triazine structures, this process appeared most promising; and considerable research and development efforts have gone toward the preparation of perfluoroalkyl triazine high polymers.

The thermally induced condensation polymerization of perfluoroalkyl diamidines into triazine structures resulted in infusible glass-like resins. Copolymerizing the diamidines with the monoamidines was theorized to reduce the number of cross links and thereby impart impact resistance to the hard plastic. This did in fact, reduce the rigidity of the material and unexpectedly gave rise to rubber-like elasticity. The copolymers retained the excellent thermal and oxidative stability of the homopolymers and could be made into hard infusible resins, cross-linked elastomers or fluids, depending upon the monomer ratios and polymerization conditions.

Melt polymerization of the diamidines (imidines) and monoamidines yielded cross-linked elastomers which could not be melted, dissolved or processed further into a useful product. In addition, the tensile properties were extremely low and were unsuitable for molded elastomer items. Increasing the ratio of monoamidine to diamidine (or imidine) helped to reduce the amount of premature cross-linking. However, none of the products were useful because the excess monoamidine, over the one to one molar ratio, formed chain terminating structures which in addition to preventing excessive cross-linking, also reduced the molecular weight. The high molecular weight is necessary for strength, elongation and processibility. In addition, before the two-to-one ratio was reached, the products were thermoplastic, i.e. had a flow temperature at which desirable elastomer properties are lost. The polymer system is chemically inert to all vulcanizing agents known, thus the thermoplastic material could not be transformed into a useful engineering material.

The next approach was solution polymerization of the dinitrile with the monoamidine. While the temperature of polymerization was reduced some and the quality of the product increased somewhat, the product and procedure did not lend themselves to making a useful material.

Still another approach was found following a detailed research study of the mechanism of preparing perfluoroalkyl sym-triazine by the deammination and cyclization of perfluoroalkyl amidines. The following mechanism was theorized. The first reaction appears to be a shift in the equilibrium between perfluoroalkyl amidine and the perfluoroalkyl nitrile according to the following equation, wherein $R_f$ represents a perfluoroalkyl radical.

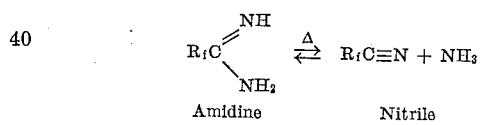

Amidine    Nitrile

Thereupon perfluoroalkyl nitrile appears to be added to the amidine resulting in the formation of the imidoyl amidine as follows:

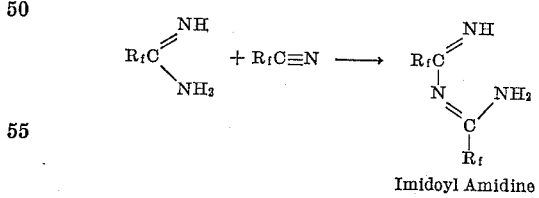

Imidoyl Amidine

Thereupon the addition of a second mole of the perfluoroalkyl nitrile to the imidoyl structure leads to the prepolymer structure as follows:

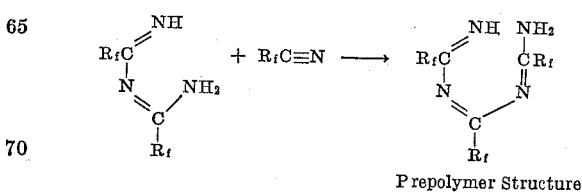

Prepolymer Structure

The elimination of ammonia from the prepolymer thereupon cyclizes to the symmetrical perfluoroalkyl triazine as shown below:

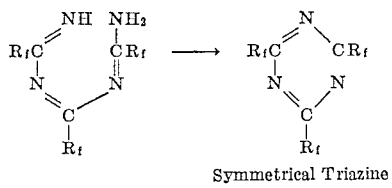

Symmetrical Triazine

The preparation of the prepolymer appeared to be possible from the cyclization mechanism by adding equal molar quantities of dinitrile to monoamidine. This could be done in a solvent or the preferred way of dissolving the monoamidine into the liquid dinitrile at 0° centigrade and allowing it slowly to warm to room temperature. The resulting white solid melts into a thin liquid at elevated temperatures, evolves ammonia and eventually thermosets into a vulcanized elastomer. The mechanical properties of tensile strength and elongation were marginally improved over the other processes and sponging prevented even cast film preparation. Compression molding of quenched viscous gel which showed promise of processability, rendered a degraded black elastomeric sponge. Apparently the amount of residual ammonia was sufficient to cause this degradation of the polymer when confined. As is readily apparent from the above brief discussion of the prior research and the results obtained therefrom, the perfluoroalkyl triazine polymers combining the potential thermal and oxidative stability with the rubber-like elastomeric properties were not made into useful engineering materials. The variety of by-products, non-reproducible results, poor mechanical properties, ammonia induced equilibria, undesired addition reactions and other difficulties led to the seemingly inescapable conclusion that the polymer system was unmanageable.

It is accordingly an object of this invention to circumvent the above problems and provide a high molecular weight linear perfluoroalkyl triazine polymer.

It is also an object of this invention to provide a perfluoroalkyl triazine polymer which is an elastomer.

Another object of this invention is the preparation of an essentially uncrosslinked perfluoroalkyl triazine elastomer which will vulcanize or crosslink upon the application of heat alone.

Still another object of the present invention is the provision of a perfluoroalkyl triazine elastomer which will have sufficient strength and mechanical properties to render it suitable for engineering applications.

Still another object of the present invention is to provide a method for the synthesis of such a perfluoroalkyl triazine polymer.

These and other objects and advantages which will be apparent from a reading of this disclosure are achieved in the case of the present invention by the provision of a meta-stable intermediate or precursor in the form of a bis-imidoyl amidine formed from two moles of a monoamidine and one more of a dinitrile. A satisfactory precursor of this class is N,N'-bis-(perfluorobutyrimidoyl) perfluoroglutaramidine prepared from perfluoroglutaronitrile and perfluorobutyramidine as shown by the following equation:

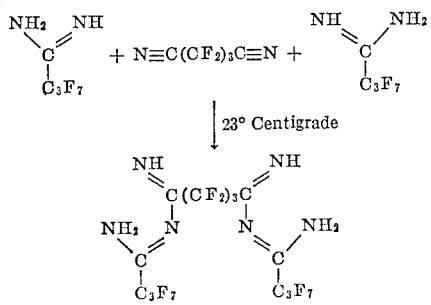

Using the new intermediate approach, the bis-imidoyl amidines can be linked together into high polymers with additional perfluoroalkyl dinitriles. It has also been found that the thermal decomposition of perfluoroalkyl diamidines or imidines in situ is also a suitable source of this dinitrile. Thus, bis-imidoyl amidine units are joined into high polymer with the simultaneous conversion to triazine structures by eliminating ammonia as the "prepolymer structure" is formed. Such a process of polymerization has in fact been found to take place at temperatures of from 120 to 150 degrees centigrade in a small amount of benzene or other suitable solvent.

It has been theorized that a principal obstacle to the formation of high molecular weight linear perfluoroalkyl triazine polymers by the aforementioned prepolymer route has been the in-chain addition of dinitrile during the prepolymer formation. Thus, while the addition reaction between perfluoroalkyl nitriles and prefluoroalkyl monoamidines was important to form the perfluoroalkyl triazine polymers, the same reaction prevented a one-step preparation of a high molecular weight linear polymer. Notwithstanding the fact that the elastomeric polymers of this type have been established as having a one-to-one mole ratio of monoamidine to nitrile, the present invention teaches the use of a two-to-one molar ratio in the formation of the intermediate. The effect of this is that one half of the dinitrile required for the one-to-one molar relationship in the final elastomeric polymer is involved in the formation of the intermediate and is therefore not available for in-chain dinitrile addition during the high polymer formation stage.

Also the use of two moles of monoamidine in the formation of the bis-imidoyl amidine constitutes all of the monoamidine required for the one-to-one molar ratio polymer. Therefore, monoamidine is not in a free state to be decomposed by the heat applied during polymerization and be consumed in the formation of a one-ring volatile and stable perfluoroalkyl sym-triazine. Because of this, the polymer is not deprived of the nonfunctional monomers that promote linearity and elastomeric properties. The remaining one-half of the dinitrile is then controlled so that it is added to the intermediate at a sufficiently high temperature that the triazine rings form with the elimination of ammonia before significant in-chain addition can occur. The dinitrile therefore, adds to the terminal imidoyl structures forming a linear polymer chain. The result of the foregoing has been the first processable and moldable perfluoroalkyl triazine elastomer which can be treated and fabricated according to conventional techniques and on conventional equipment. Vulcanizates exhibit tensile strengths of from 200 to 600 pounds per square inch, 100 percent elongation, and a high order of stability at 430 degrees centigrade.

By way of specific examples, further to describe the present invention, one processable prefluoroalkyl triazine elastomer was produced as follows. 65.7 grams of perfluorobutyramidine were purified by sublimation and dissolved at 45 degrees centigrade in 250 milliliters of anhydrous benzene in a 500 milliliter 3-neck flask which was fitted with a mechanical stirrer, a 200 degree centigrade thermometer and a Y-connector to which was connected a 70 milliliter micro-addition funnel and a reflux condenser. The exit from the condenser was fitted with a gas exit tube leading to bubble traps. 31.3 grams of perfluoroglutaronitrile were distilled from phosphorous pentoxide ($P_2O_5$) and collected in the micro addition funnel under anhydrous conditions. The dinitrile was diluted with about 50 milliliters of anhydrous benzene, and the solution was added drop-wise to the benzene solution of the monoamidine with rapid stirring over a five hour period to provide the bis-imidoyl amidine intermediate or precursor. To this intermediate were then added 33.9 grams of the perfluoroglutarimidine, which upon heating decomposes into dinitrile and ammonia. The mixture was stirred and heated to 82 degrees centigrade whereupon the benzene refluxed. The temperature of the mixture was then steadily increased by distilling off most of the benzene to 104 degrees centigrade where it was maintained for one and one-half hours, then to 127 degrees centigrade for one hour and finally to approximately 150 degrees centigrade for 30 minutes, whereupon a weak gel with about 50 to 100 percent elongation resulted. The gelled polymer was placed on a mill where it was changed to a smooth processing gum which was thereupon placed in a compression ponitrile and perfluorocaprylamidine, from perfluoroadipamidine and perfluorocaprylonitrile and perfluoroadiponitrile and perfluorobutyramidine. All of these procedures resulted in an intermediate or precursor, which when heated with additional dinitrile, or diamidine, or imidine yielded elastomeric perfluoroalkyl triazine polymers closely approaching the optimum one to one monomer ratio of which the following chemical structure is typical.

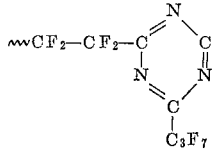 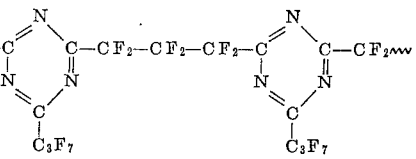

mold at 165 degrees centigrade for 20 minutes and removed directly from the hot mold. It was thereupon placed in a circulating air oven at 300 degrees centigrade for 16 hours. The tensile strength of this gum vulcanizate was 190 pounds per square inch, and the elongation was 100 percent. When exposed to 430 degrees centigrade temperatures in an air oven for 5 hours, there was no apparent loss of tensile strength or elongation.

In experience with this material, the solid reactants (bis-imidoyl amidine recrystallized from toluene, M.P. 104–110° C.) and perfluoroglutarimidine were initially ground under nitrogen in a dry box, then weighed and refluxed 72 hours in a suitable solvent such as benzene. The solvent was then removed to a bath temperature of 150° C. in 4 hours. The residual solvent except as noted below, was then removed at 150° C. at 8–24 millimeters on a water aspirator. Six (.05 mol) reactions were run in pairs, the first two having a slow nitrogen sweep. In 72 hours, 90% of the theoretical amounts of $NH_3$ had evolved. The second pair of reactions was run as the first, except that a static nitrogen blanket was maintained rather than a purge. This decreased the ammonia evolution to 60% of theory during the 72 hour reflux period. The last pair of reactions was run as was the second pair, except that after the 4 hour solvent stripping period, the residual solvent was removed at 150° C. in a nitrogen sweep rather than with a water aspirator vacuum in order to prevent any water vapor reaction with the triazine groups. No differences in the products could be attributed to these process variations. The products were blended on a rubber mill and molded in a 6″ x 6″ x .075″ mold at 160–220° C., and about 500 pounds per square inch pressure. The sheets exhibited a tensile strength of 536 pounds per square inch and were smooth with no breaks, cracks or adhesions to the mold.

The important intermediates, the bis-(perfluoroalkyl) imidoyl amidines, can be prepared from variations on the basic addition method and from differing monomers as is illustrated by the following examples. 84.8 grams (0.4 mole) of perfluorobutyramidine and 400 milliliters of sodium dried benzene were placed in a 3-necked flask equipped as in the foregoing example and a solution of perfluoroglutaronitrile (40.4 grams or 0.2 mole in 40 milliliters of benzene) was added dropwise with stirring at 44–46° C. over a one hour period. The cloudy solution cleared when heated 10 minutes at 80° C. and on cooling the solution deposited 95 grams (76%), bis-imidoylamidine. An analytical sample, M.P. 115–119° C., was obtained after three recrystallizations from benzene and drying 6 hours at 0.2 mm. at room temperature. Another analytical sample of this material was prepared by three recrystallizations from chloroform followed by drying 7 hours at 65° C. under a vacuum and had a melting point of 112–116° C. This bis-imidoylamidine was similarly prepared by adding the dinitrile to the monoamidine in diethylether at 5° C. and allowing the mixture to stand at room temperature for two days. The yield in this case was 87% with a melting point of 108–114° C.

Similar compounds have been prepared from perfluoroglutaronitrile and perfluorocaprylamidine, perfluoroadiponitrile and perfluorocaprylamidine, from perfluoroadipamidine and perfluorocaprylonitrile and perfluoroadiponitrile and perfluorobutyramidine. All of these procedures resulted in an intermediate or precursor, which when heated with additional dinitrile, or diamidine, or imidine yielded elastomeric perfluoroalkyl triazine polymers closely approaching the optimum one to one monomer ratio of which the following chemical structure is typical.

While the within invention has been here described in considerable detail in connection with certain particular embodiments thereof, it is to be understood that the foregoing particularization and detail have been for the purposes of illustration only and do not limit the scope of the invention as it is more precisely defined in the subjoined claims.

I claim:
1. A method of preparing a perfluoroalkyl triazine elastomer comprising reacting (a) a bis-(perfluoroalkyl) imidoyl amidine with (b) a perfluoroalkyl dinitrile in a suitable solvent, said amidine and dinitrile being in a molar ratio of one to one, at a temperature from 120 to 150° C.

2. A method according to claim 1 wherein said dinitrile is a member selected from the group consisting of perfluoroglutaronitrile and perfluoroadiponitrile.

3. A method according to claim 1 wherein said bis-(perfluoroalkyl)imidoyl amidine is selected from the group consisting of N,N'-bis-(perfluorobutyrimidoyl)perfluoroglutaramidine, N,N' - bis - (perfluorocaprylimidoyl) perfluoroglutaramidine, N,N'-bis-(perfluorobutyrimidoyl) perfluoroadipamidine, and N,N'-bis-(perfluorocaprylimidoyl)perfluoroadipamidine.

4. A composition of matter for use as a meta-stable intermediate for the two-step formation of high perfluoroalkyl triazine polymers according to the following structure

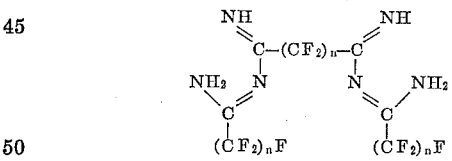

wherein $n$ is an integer of 1 to 7.

5. As a new composition of matter, for use as an intermediate in the formation of perfluoroalkyl triazine elastomers, N,N'-bis-(perfluorobutyrimidoyl)perfluoroglutaramidine.

6. As a new composition of matter for use as an intermediate in the formation of perfluoroalkyl triazine elastomers, N,N'-bis-(perfluorocaprylimidoyl)perfluoroglutarramidine.

7. As a new composition of matter for use as an intermediate in the formation of perfluoroalkyl triazine elastomers, N,N'-bis-(perfluorobutyrimidoyl)perfluoroadipamidine.

8. As a new composition of matter for use as an intermediate in the formation of perfluoroalkyl triazine elastomer, N,N'-bis - (perfluorocaprylimidoyl)perfluoroadipamidine.

References Cited
UNITED STATES PATENTS
3,086,946   4/1963   Brown _____ 260—248

JOSEPH L. SCHOFER, *Primary Examiner.*

J. KIGHT, *Assistant Examiner.*